United States Patent
Lingl

[11] 3,881,981
[45] May 6, 1975

[54] DEVICE AND METHOD FOR PREFABRICATING WALL PANELS FROM BLOCK-LIKE ARTICLES

[76] Inventor: Hans Lingl, Fasanenweg 14, 7910 Neu-Ulm, Ludwigsfeld, Germany

[22] Filed: Nov. 7, 1973

[21] Appl. No.: 413,459

Related U.S. Application Data

[62] Division of Ser. No. 186,628, Oct. 5, 1971, Pat. No. 3,790,428.

[30] Foreign Application Priority Data

| Oct. 6, 1970 | Germany | 2048944 |
|---|---|---|
| Jan. 19, 1971 | Germany | 2102291 |
| June 11, 1971 | Germany | 2129010 |

[52] U.S. Cl. .............................. 156/297; 52/747
[51] Int. Cl. ..................... B32b 31/00; E04b 1/00
[58] Field of Search .......... 156/297, 558, 390, 556, 156/557, 538; 52/749, 747, 745

[56] References Cited
UNITED STATES PATENTS

| 3,382,640 | 5/1968 | Thomas et al. | 52/749 |
|---|---|---|---|
| 3,585,092 | 6/1971 | Storer | 156/558 |
| 3,789,101 | 1/1974 | Wright et al. | 52/749 |

*Primary Examiner*—Douglas J. Drummond
*Attorney, Agent, or Firm*—Cushman, Darby & Cushman

[57] ABSTRACT

A device and method for prefabricating wall panels from block-like articles comprising a first gripper for picking up rows of blocks from a storage area and placing them upon a conveyor belt so as to leave gaps between rows; a feeding device for supplying special blocks to at least partially fill these gaps, a mortar applying device which applies mortar to the upper faces of the rows of blocks and a second gripper for transferring the rows from the conveyor to a descending support device in which panels are created by stacking the rows. The panels may then be treated on one or both sides as with stucco. In addition, mortar may be supplied to individual rows or to the whole panel through a plurality of tubes which communicate with the facing edges of adjacent blocks and further, dividing or aligning plates may be associated with the second gripper to produce gaps in the rows to create a plurality of panels or an aperture within a single panel.

11 Claims, 12 Drawing Figures

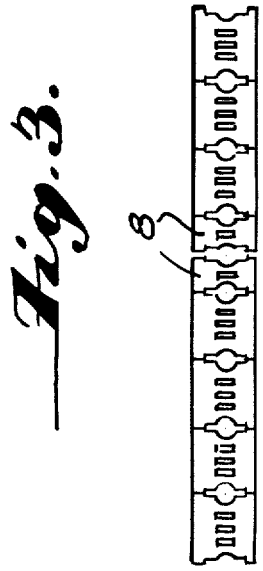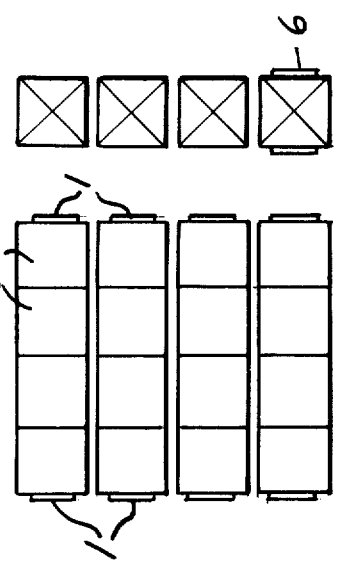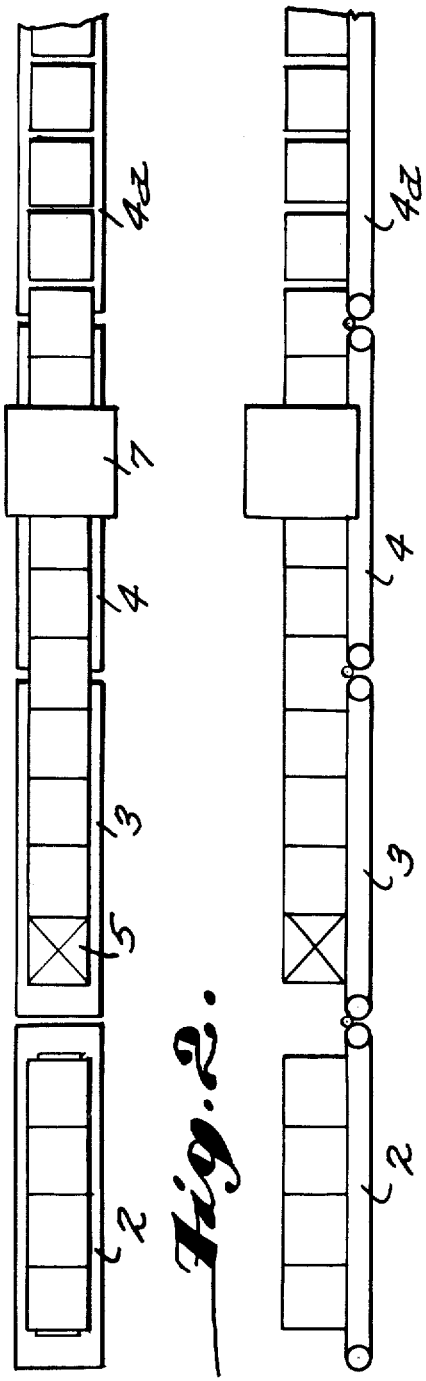

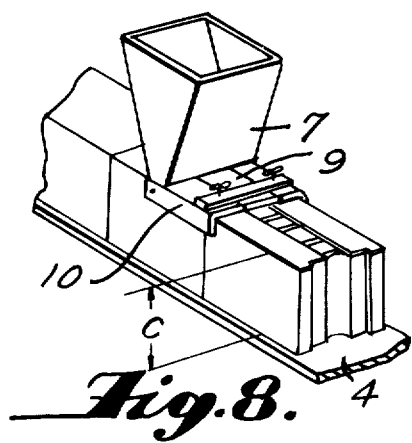
Fig. 6.
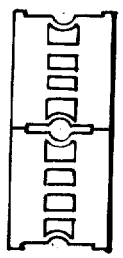
Fig. 8.
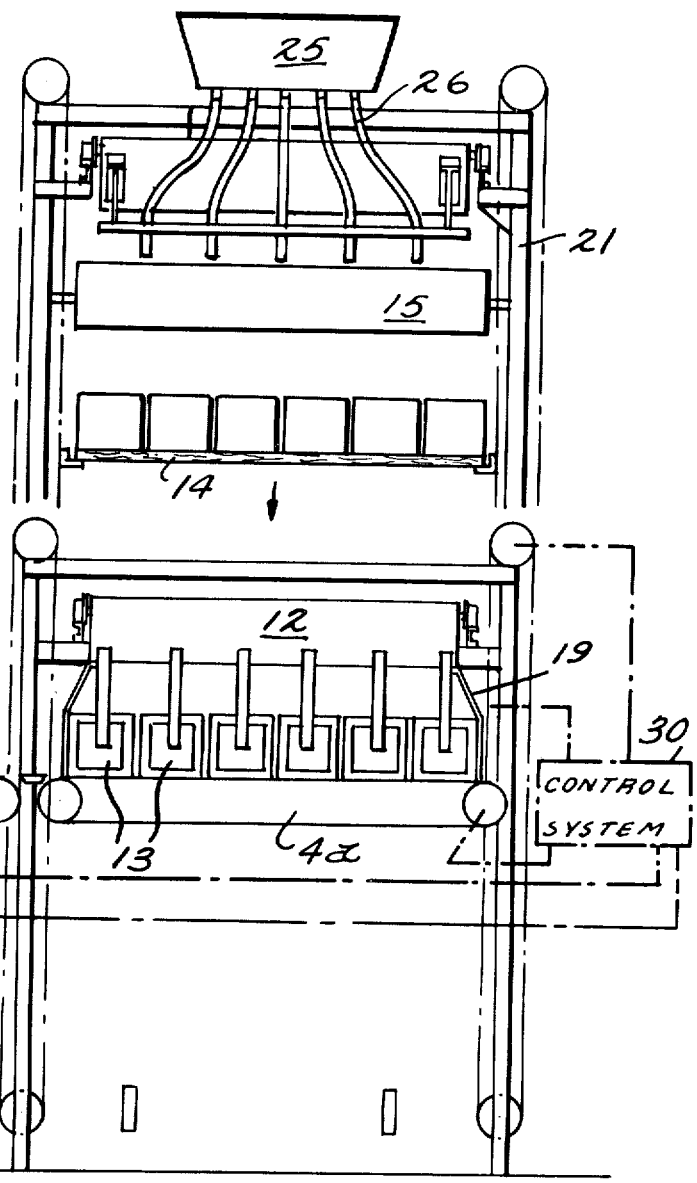
Fig. 7.
Fig. 9.

DEVICE AND METHOD FOR PREFABRICATING WALL PANELS FROM BLOCK-LIKE ARTICLES

This is a division of application Ser. No. 816,628 filed Oct. 5, 1971 now Pat. No. 3,790,428.

BACKGROUND OF THE INVENTION

1. Field Of The Invention

This invention relates to a device for the prefabrication of wall panels from bricks or similar block-like articles, which enables an operator to produce panels of various sizes or widths automatically.

1. Description Of The Prior Art

It is already known to produce wall panels with bricks in such a way that these panels are constructed primarily with manual labor while during the brick laying process, in the sequence as the rows of bricks are laid the panel is lowered on a pallet to maintain a certain working level. It is also known to align bricks on a conveyor belt, to group these bricks and to apply mortar, to tilt them after the mortar is applied and to arrange them in a horizontal frame in which the rows are closed up in the operating sequence to form wall panels which are erected into vertical position after the panel has been constructed. This device however does not allow exact mortar application and joint construction, as upon tilting of the bricks the mortar tends to run off or at least to deform and differences in the size of individual bricks cannot be sufficiently balanced.

OBJECTS AND SUMMARY OF THE INVENTION

The object of the invention is to improve prior practice so that wall panels may be prefabricated with bricks or similar articles, precisely, mechanically, and in a continuous process.

A further object of this invention is to provide novel structures and techniques for automatically and efficiently producing a wall panel of bricks or similar articles in one operating sequence, maintaining the advantageous characteristics of the structural clay construction material.

The invention involves a gripper which transfers blocks or bricks from a stack or first station onto a sectional conveyor device which is furnished with a feeding device to supply special blocks into spaces between the blocks supplied from the first station. The rows of blocks are then led through a mortar feeding device which is positioned at a certain distance from the conveyor level which feeds mortar onto the bed face of the block. At the end of the conveyor a gripper simultaneously aligns the rows of blocks, picks them up and places them in panel lengths on a support platform which descends in steps according to the progress of construction of the panel until it reaches a horizontal transport means. Following the horizontal transport means another vertical transport means works in conjunction with a stucco applying device to complete the wall.

The device according to the invention has a higher capacity than known ones. It is simpler and more reliable, as it constructs prefabricated block wall panels automatically and arranges and aligns individual rows of blocks in rapid sequence for construction of precisely dimensioned wall panels. The device further allows lengths and numbers of panels to be adjustable by the adjustment of the gripper device and allows panels of variable lengths or with variable apertures for windows or doors or the like to be formed. Finally, the device, according to the invention, since it constructs panels in vertical movement, requires little space.

BRIEF DESCRIPTION OF THE DRAWINGS

An example of the application of the invention is described by attached drawings in which:

FIG. 1 shows a device according to the applicants's invention for grouping blocks in rows and feeding special blocks into spaces between these rows in top view.

FIG. 2 shows a side view of the device of FIG. 1.

FIG. 3 shows an arrangement of the blocks with special blocks, for example, half blocks, introduced and divided in two panel lengths $a$ and $b$ as arranged by the device of FIGS. 1 and 2.

FIG. 6 shows a mortar supplying device.

FIG. 7 shows a device according to FIG. 5 as viewed from the right to the left in FIG. 5 with elements omitted for convenience of illustration.

FIG. 8 shows the construction of head joints created by the above devices in top view.

FIG. 9 shows a device according to FIG. 5 as viewed from the left to right in FIG. 5 with elements omitted for convenience of illustration.

DETAILED DESCRIPTION OF THE PREFERRED EMBODIMENTS

Figure 11:
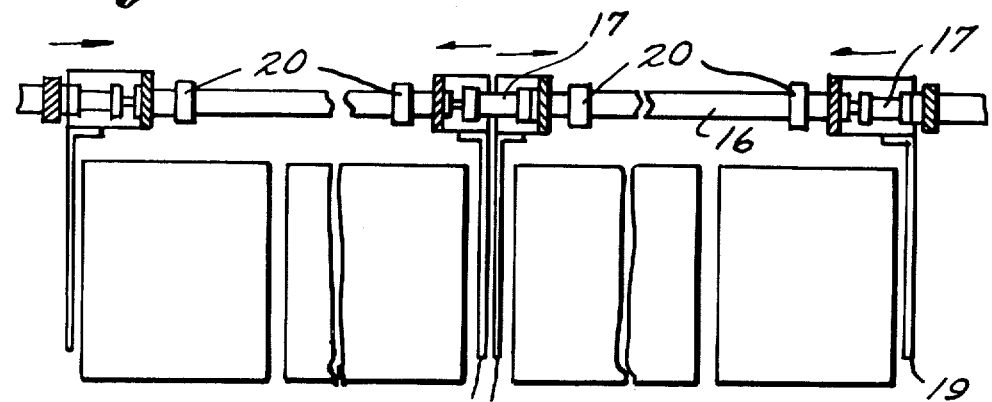
FIG. 11 shows a detailed side view of a gripper according to FIG. 10.
Figure 12:
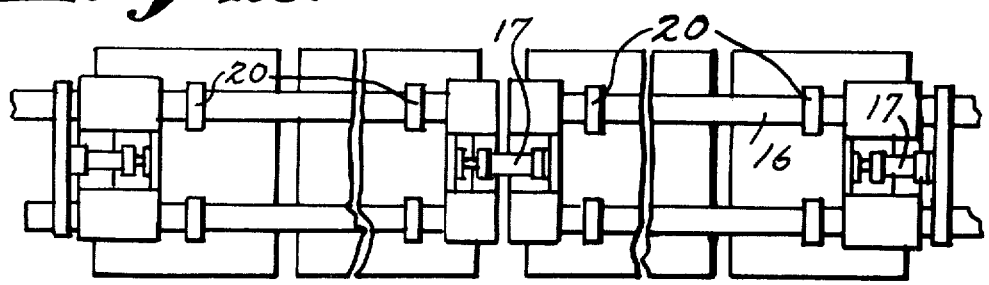
FIG. 12 is a top view of gripper according to FIG. 10.

Referring to the drawings, especially FIG. 1 and 2, the blocks B are picked up by a gripper 1 (such as that shown in FIGS. 10–12) from a kiln car or other transport and storage means and are transferred and arranged in rows on a conveyor 2. These rows are then transferred in programmed sequence onto a conveyor 3 in such a way that they are spaced to allow introduction of half blocks 8 or of special blocks 5 by gripper 6 which allows one row to be offset by one half block length with the adjacent rows to give a greater stability to the completed panel. The rows may also be separated from one another along the conveyor as shown in FIG. 3 to create rows of different lengths.

After introduction of half or special blocks the rows of blocks are transferred from conveyor belt 3 onto conveyor belt 4 which is driven at reduced speed relative to belt 3. By this means the rows of blocks are closed up while passing through the conventional mortar application device 7 which applies a continuous layer of mortar (FIGS. 1 and 2).

The mortar feeding device 7 (FIG. 6) applies a layer of mortar on the rows of blocks, leveling it off a distance $c$ from the top of the conveyor belt. The middle of device 7 is covered by tongue 9, so that the mortar is applied in two external strips removed from one another by a distance equal to the width of tongue 9. In this manner blocks having hollow center portions such as those shown in FIG. 6 can be effectively jointed into wall sections without an excessive loss of mortar. Scraping gate 10 is also provided with the mortar feeding device which is adjustable in distance $c$ to the face of the belt 4 so that differences in block size are automatically controlled.

Figure 4:
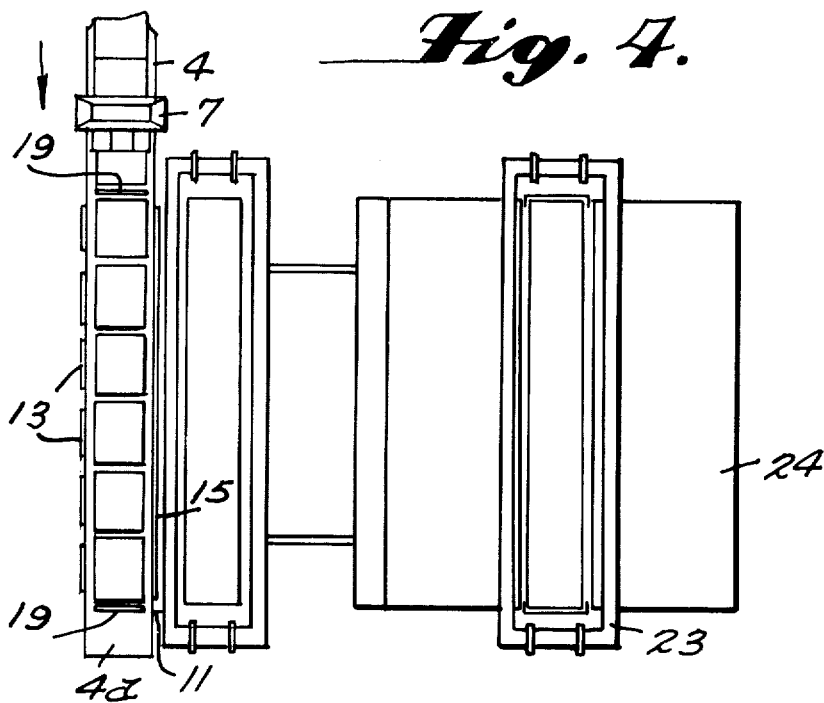
FIG. 4 shows a device for the construction of the panels in top view.
Figure 10:
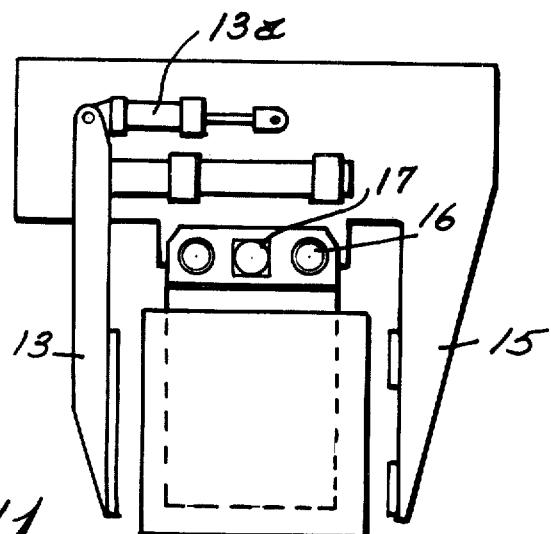
FIG. 10 shows a detail end view of the gripper used in FIGS. 5, 7 and 9.

After the mortar bed has been applied, the row of blocks is transported via conveyor 4a to stop 11 (FIGS. 4 and 5) which actuates the stopping of conveyor belt 4a. Since belt 4a is operated at a greater speed than belt 4 spaces are created between the blocks while traversing conveyor 4a. The gripper assembly 12 which can be furnished with grippers 13 rolls along rails 12a to the position shown in FIG. 5 at which point the aligning plates 18 (FIG. 11) are interspersed between at least some of the blocks B, and the grippers 13 and ledge 15 surround the blocks B as shown in FIG. 10. Cylinders 13a are then activated to cause grippers 13 to move towards ledge 15 which grips the rows of blocks.

As stated above, the grippers 13 oppose with a rigid continuous gripper ledge 15 (FIG. 10) and aligning plates 18 are arranged along and perpendicular to the length of gripper ledge 15 and are suspended from support rail 16. These plates 18 as well as end plates 19 are movable by pressure cylinders 17 which are, in turn, adjustable to any place in the length of gripper ledge 15 (FIGS. 11 and 12) the movement of the aligning plates 18 being controlled by adjustable stops 20. By inserting aligning plates 18 between the rows of blocks and the end plates 19 at the ends of the rows during gripping and then opening a space between these plates by means of the pressure cylinders 17 a plurality of precisely aligned panel lengths may be arranged within a single length of ledge 15. Of course, by vertically aligning rows of blocks which have the same size spacings formed therein but which have complete rows disposed vertically above and below the apertures, door and window holes may be automatically formed within the panels as the row or rows of blocks which have been placed on support 14 are lowered in steps by lowering device 21.

Figure 5:
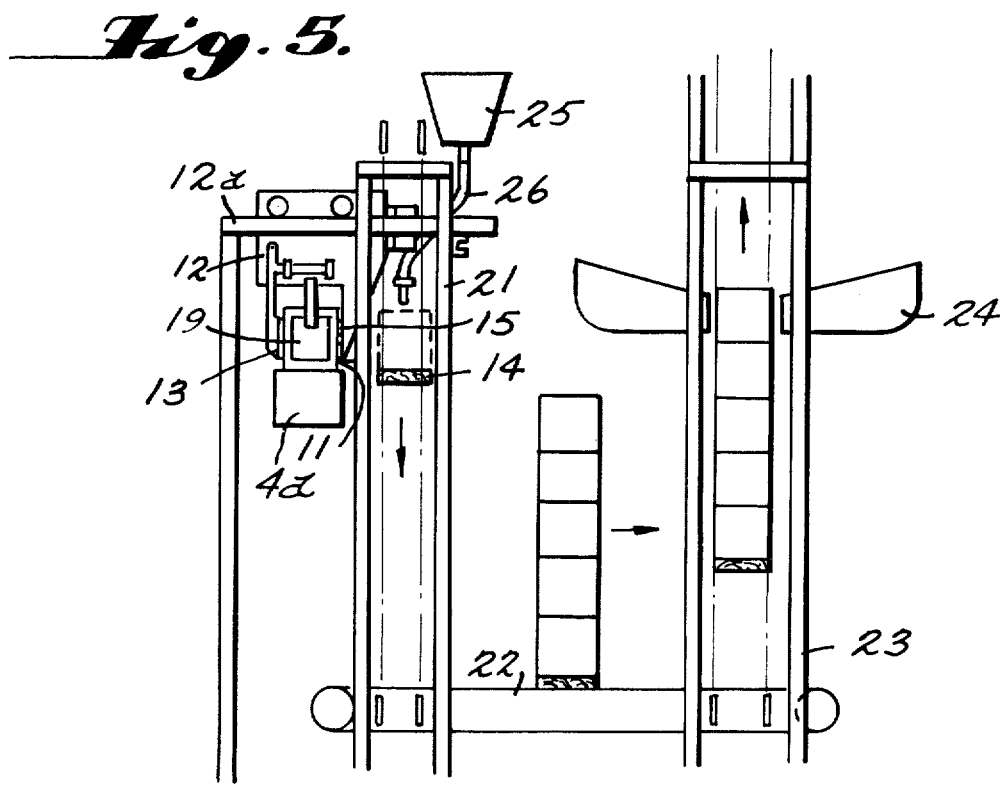
FIG. 5 shows a device according to FIG. 4 in a side view.

After the panel has been constructed in the desired height, the support 14 comes to rest on a horizontal transport means 22 (FIG. 5) which transports the panel in steps out of device 21 and to another vertical transport means 23 (FIG. 5). While the wall panel is elevated by transporter 23 to the working area, a plastering device 24 may apply stucco or other appropriate facings.

Under certain conditions it may be desirable to apply mortar to the side faces of bricks or blocks as well as the top surfaces of the bricks or blocks. If this is desired large dimensioned blocks are provided with a recess in the middle of the head joint, for example with a round half segment cross section as shown in FIG. 8. From this round segment recess narrow recesses extend to both sides ending some distance from the outer edge of the block to provide a stop. The head joint opening thus provided is filled with mortar from a head joint filling device 25 and with mortar supply pipes 26 (FIGS. 5 and 7) which are provided over lowering device 21, or over horizontal transporter 22. Filling of head joints can take place from layer to layer or over the full height of the panel.

To increase its capacity the device can be furnished with several parallel transporters and mortar supply devices suspended over these transporters, each transporter being furnished with a gripper and descending device 21 as well as an elevator. By this means it is possible to produce standard panel sizes of different widths, different height, with recesses for windows and doors, in continuous production and without necessity of readjustment. Of course the device may be made fully automatic by the operation of the conventional control system shown diagrammatically in FIG. 9 as number 30 which, in known manner, coordinates the activities of the grippers and vertical and horizontal conveyors described above to provide desired products.

What is claimed is:

1. Process for mechanically constructing a vertical wall section from blocks and mortar, wherein said process comprises the steps of:
    a. placing a row of said blocks onto a horizontal conveying means, with said blocks having their top surface pointing upwardly and horizontally conveying said rows of blocks;
    b. inserting further blocks into spaces between said rows, said further blocks having different horizontal dimensions than said first-mentioned blocks;
    c. applying mortar to the top surface of said blocks by a mortar applying means disposed at a predetermined height above said first horizontal conveying means;
    d. transporting rows of said blocks having overall lengths corresponding to a course of blocks in said wall section to a location; and
    e. placing said lengths of blocks, one length on top of another onto a descending support means and descending said lengths stepwise between each successively received length of blocks whereby a vertical wall section is mechanically formed from said first-mentioned blocks and said further blocks on descending support means.

2. Process as described in claim 1 further comprising the step of further horizontally transporting said vertical wall section after its mechanical construction on said descending support means.

3. Process as described in claim 2 further comprising the step of vertically transporting said vertical wall section means after said further horizontal transporting step.

4. Process as described in claim 3 further comprising the step of applying a surface finish to a vertical surface of said vertical wall section as it is being vertically transported therein.

5. Process of claim 1 wherein said horizontal conveying step comprises the steps of
    a. conveying said rows of blocks on a first horizontal conveying means
    b. conveying said rows of blocks on a second conveying means adapted to receive said blocks from said first conveying means, said second conveying means forming spaces between said blocks.

6. Process of claim 5 wherein said inserting step comprises the step of inserting said further blocks into said spaces formed between said blocks on said second conveying means.

7. Process of claim 6 wherein said process further comprises the step of conveying said rows of blocks on a third conveying means, wherein said third conveying means transports said blocks slower than said second conveying means so that the blocks on said third conveying means will accumulate adjacent to one another so that closed-up rows are formed.

8. Process of claim 7 wherein said mortar applying step comprises applying mortar to the top of said closed-up rows of blocks on said third conveying bmeans.

9. Process of claim 1 wherein the transporting step and descending step further comprise a plurality of transporting and descending steps cooperating with the other recited steps so as to increase the effective capacity of the process.

10. The process of claim 1 wherein said transporting step further comprises the step of mechanically gripping and spacing said blocks so that a head joint is formed between each of said blocks by an equal amount.

11. The process of claim 1 wherein said transporting step further comprises the step of simultaneously filling headjoints between said blocks with mortar.

* * * * *